Nov. 5, 1946.   A. P. DAVIS   2,410,602
JOURNALLING MECHANISM
Filed Aug. 31, 1944
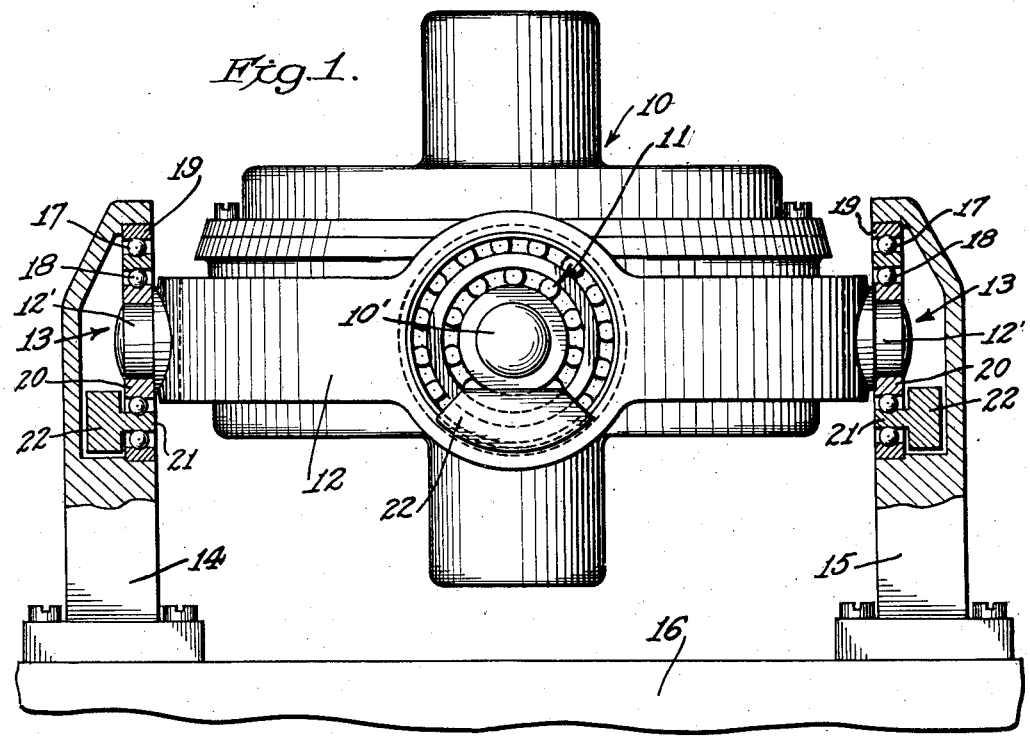
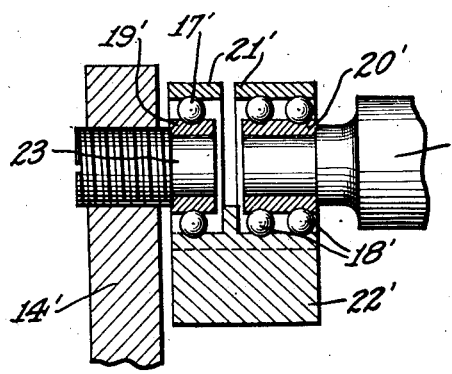 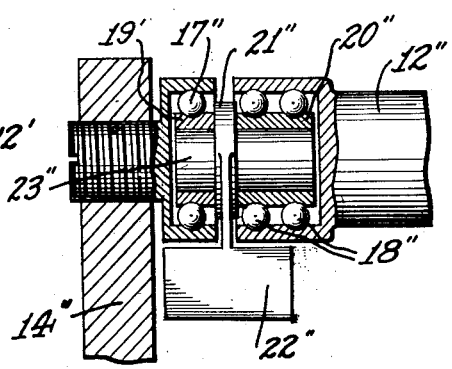
INVENTOR:
ARTHUR P. DAVIS
BY
ATTORNEYS Patented Nov. 5, 1946

2,410,602

UNITED STATES PATENT OFFICE 2,410,602

JOURNALING MECHANISM

Arthur P. Davis, New York, N. Y., assignor to Arma Corporation, Brooklyn, N. Y., a corporation of New York Application August 31, 1944, Serial No. 552,126

13 Claims. (Cl. 308—183)

1

This invention relates to journaling mechanisms, and has particular reference to mechanism for materially reducing the frictional drag of friction-reducing bearings used on precision instruments and machinery, although the invention is not limited to that use.

Ordinary rolling bearings, particularly ball bearings, as is well known, may have a coefficient of friction as low as about .001, even when heavily loaded, and selected ball bearings have even less friction, but nevertheless the residual friction remaining is sufficient to preclude the absolute precision that is required for certain instruments. Ultra precision instruments employing gyroscopes as a datum point are an example.

In accordance with the invention, a journaling mechanism, particularly adapted for rolling bearings, is provided, which counteracts the frictional drag in the journals, and in that way materially reduces and in many cases wholly eliminates the errors which result from journal friction and which friction, in the case of a gyroscope, causes erroneous precession thereof.

The invention consists in the inclusion in the journal between two series of rolling bearings, such as ball-bearings of a ring which is so arranged as to be pendulous and hence to respond to gravitational forces while at the same time being free to rotate in the journal independently of the relative movement between the journaled parts. When roller or needle bearings are employed, the pendulous ring is similarly mounted. Consequently, in a journal equipped with the mechanism of this invention, relative rotation between the parts of the bearing, as during an oscillation of a shaft within its journal, the unavoidable frictional drag causes the pendulous ring to be displaced in one direction, but it is immediately restored by gravity. However, its freedom of movement results in overswing of the pendulous ring so that it oscillates and introduces a freeing vibration to the balls, thus materially reducing the frictional drag in the journal.

It will be seen that the present invention provides a very simple, inexpensive and compact but effective means for overcoming the last modicum of friction in so-called frictionless journals. When used on a gyroscope, the invention precludes precession about the journals of its suspension which results in an angular displacement of the gyro which is more or less than the actual tilt. In other organizations involving oscillating bearings for various purposes, the simple journaling mechanism of this invention finds application with excellent results, since by means of it friction is reduced to the absolute minimum, and in many cases wholly eliminated for all practical purposes.

For a more complete understanding of the invention, reference may be had to the accompanying drawing, in which:

Figure 1 illustrates one form of the invention, as adapted to journals of a gyroscope suspension, by way of example of its use;

Fig. 2 is an enlarged axial section of a modification in which the several rows of bearing balls are axially arranged as compared to the arrangement of Fig. 1, in which the bearing balls are all located in a plane normal to the axis; and Fig. 3 is an enlarged axial section through a modification of the arrangement of Fig. 2.

Referring to Fig. 1 of the drawing, numeral 10 designates a gyroscope or other sensitive instrument mounted in the usual Cardan suspension, modified, however, by the novel journaling mechanism of this invention. Thus, the gyroscope 10 is supported in the journaling mechanisms 11 of this invention in gimbal ring 12, which in turn is mounted by similar journaling mechanism 13 on the standards 14 and 15 secured to an unstable platform 16, such as a ship, airplane, or the like. Considering the gyroscope 10 as illustrative of one application of the invention, it is well understood that it is essential that the gyroscope be free from friction, since it causes unwanted precession introducing errors. By materially reducing or eliminating journal friction, the present invention provides the desired accuracy.

The journaling mechanisms 11 and 13 each includes more than one series of rolling members, such as the two circular series of bearing balls 17 and 18, as shown in Fig. 1. The outer series 17 cooperates with the outer race 19 mounted on standard 14, and the inner series 18 cooperates with the inner race 20 mounted on the pivot 12' of the gimbal ring 12. The journal between the pivot 10' of the gyroscope 10 and gimbal ring 12 similarly includes the outer and inner series of bearing balls 17 and 18, respectively.

Interposed between the outer series of balls 17 and inner series of balls 18 is a special race 21 which is shaped in the form of a ring, as shown, but is provided with an offset weight or enlargement 22 rendering the ring 21 pendulous, since the eccentric center of gravity of the weight or enlargement 22 renders the ring 21 responsive to gravitational forces in the manner of a pendulum. In view of the relative freedom of the ring 21 by reason of the comparatively frictionless character of the ball series 17 and 18 in which it is, in effect, suspended, the pendulous ring 21 tends to seek and maintain a position such that the weight or enlargement 22 thereof lies at the lowermost point, as shown in Fig. 1.

In operation of the journaling mechanism of Fig. 1, and still assuming for purposes of illustration, that it is used in the journals of a gyroscope 10, and further assuming that the gyroscope is mounted on shipboard, tilting movement of the platform 16 results in relative movement between it and the gyroscope 10. As seen on shipboard, the gyroscope 10 remains level, but if any restraint is placed thereon, as by friction in the journals, it tends to precess in response to this restraint and an error in indication results. Except for the presence of the invention, a tilt about axis 13, 13 would cause a frictional drag about this axis, resulting in rotation of the gyroscope 10 about bearings 11.

The journaling mechanism of the present invention precludes this error by virtually eliminating the frictional drag in the journals. As the gyroscope 10 tilts about axis 13, 13, in the assumed case, the inevitable small friction between the balls 17 and race 19 causes a small drag on the ring 21, thus carrying the latter with the standard 14, assuming the gyroscope 10 to remain stationary.

This rotary deflection of member 21, however, is very small, because as soon as it occurs, gravity, acting on the weight or enlargement 22, tends to pull it back to vertical position, but as in the case of a free pendulum, the weight or enlargement 22 overswings, due to its momentum, and is carried up on the opposite side of the vertical. Consequently, the pendulous members 21, 22 acts as a true pendulum and oscillates at its natural period. By reason of the sensitive bearings employed, the mean range of motion of the pendulous ring 21 is substantially equal to the range of motion of one of the relatively rotating parts between which the bearing is positioned.

Accordingly, during the entire time that the platform 16 is moving angularly in any manner, the pendulous members 21, 22 in both journals 11 and 13 oscillate slightly and rapidly about the vertical. The pendulous members 21, 22 thus partly follow the race 20 in an oscillatory manner, which results in freeing the gyroscope from any appreciable restraint, as will be readily understood.

The journal arrangement of Fig. 1 is adaptable where the radius of the bearing may be made sufficiently large to accommodate the pendulous member 21, but in other cases the double row of balls may be used distributed along the axis instead of radially, as in Fig. 2. This arrangement comprises an inward extension 23 on the standard 14' coincident with the axis of the gimbal ring 12'. The extension 23 carries the race 19', on which rolls the ball series 17', whereas the ball series 18' rolls on the shaft extension of the gimbal ring 12'. The pendulous ring 21' having the integral enlargement or weight 22' encircles both sets of balls 17' and 18' in the manner shown, and forms the dual function of connecting the two coincident shafts of gimbal ring 12' and standard 14' and serving as a bearing.

During relative movement between gimbal ring 12' and standard 14', as during a tilt of the deck, the frictional drag between the balls and their races causes members 21', 22' to be displaced from the vertical, to be at once restored by gravity with resulting pendulous oscillations thereof, thus virtually eliminating friction in the manner described. The double row of balls 18' is used to prevent cocking, although in other installations a single row will be sufficient. The arrangement of Fig. 2 has the advantage that no special provision for its use is required, other than the addition of pendulous member 21', 22'.

Instead of mounting the pendulous ring 21' externally of the aligned shaft, as in Fig. 2, the parts may be reversed as in Fig. 3. The aligned shafts 12'' and 23'' are recessed or in tubular form and the pendulous member 21'' in the form of a rod is supported in one or more rows of ball bearings 17'' and 18'' interposed between corresponding races 19'' and 20'' on the outer surface of the rod 21'' at each end and the inner surfaces of the corresponding tubular shafts 23'' and 12''. The eccentric weight 22'' depends from rod 21'' between the spaced ends of the tubular shafts 12'' and 23'' and two rows of balls 18'' may be used to prevent cocking of shaft 12''.

While certain preferred embodiments of the invention have been illustrated and described herein, it is to be understood that the invention is not limited thereby but is susceptible of changes in form and detail within the scope of the appended claims.

I claim:

1. A self-contained journaling mechanism for relatively rotating concentric parts, comprising a ring interposed between said parts, and means rendering said ring pendulous, whereby the relative movement between said parts imparts a limited pendulous oscillation to said ring to thereby reduce the friction incident to said relative rotation of said parts.

2. A self-contained journaling mechanism for relatively rotating concentric parts, comprising anti-friction means interposed between said parts, a ring interposed between said parts and rotatably engaging said means, and means rendering said ring pendulous, whereby the relative movement between said parts imparts a limited pendulous oscillation to said ring to thereby reduce the friction incident to said relative rotation of said parts.

3. A self-contained journaling mechanism for relatively rotating concentric parts, comprising a rolling bearing engaging each of said parts, a ring engaging both of said bearings, and means rendering said ring pendulous, whereby the relative movement between said parts imparts a pendulous oscillation to said ring limited to the range of such movement to thereby reduce the friction incident to said relative rotation of said parts.

4. A self-contained journaling mechanism for relatively rotating concentric parts, comprising a series of rolling bearings engaging each of said parts, a ring engaging both of said bearing series, and means rendering said ring pendulous, whereby the relative movement between said parts imparts a pendulous oscillation to said ring limited to the range of such movement to thereby reduce the friction incident to said relative rotation of said parts.

5. A self-contained journaling mechanism for relatively rotating concentric parts, comprising a series of ball bearings engaging each of said parts, a ring engaging both of said bearing series, and means rendering said ring pendulous, whereby the relative movement between said parts imparts a pendulous oscillation to said ring limited to the range of such movement to thereby reduce the friction incident to said relative rotation of said parts.

6. A self-contained journaling mechanism for relatively rotating concentric parts, comprising anti-friction bearing means interposed between said parts, a ring interposed between said parts and rotatably engaging said bearing means, and means rendering said ring pendulous, whereby the relative movement between said parts imparts a pendulous oscillation to said ring limited to the range of such movement to thereby reduce the friction incident to said relative rotation of said parts.

7. A self-contained journaling mechanism for relatively rotating concentric parts, comprising a circular series of rolling bearings engaging each part, and a ring interposed between and engaging each circular bearing series and concentric therewith and having an eccentric center of gravity rendering said ring pendulous, whereby the relative movement between said parts is transmitted through said bearings to said ring to impart thereto a limited pendulous oscillation reducing the friction incident to said relative rotation of said parts.

8. A self-contained journaling mechanism for connecting relative rotating concentric parts, comprising two circular series of ball bearings interposed between said parts and lying in the same plane, and a ring interposed between said series and concentric therewith and having an eccentric center of gravity rendering said ring pendulous, whereby the relative movement between said parts is transmitted through said balls to said ring to impart thereto a limited pendulous oscillation reducing friction incident to said relative rotation of said parts.

9. A self-contained journaling mechanism for a shaft in a journal, comprising a series of rolling bearings encircling said shaft, a second circular series of rolling bearings engaging said journal and lying in the plane of said first series and spaced radially therefrom and concentric therewith, and a ring interposed in the annular space between said series of bearings and engaging the same and having an eccentric center of gravity rendering said ring pendulous, whereby the relative rotation between said shaft and its journal is transmitted through said bearings to said ring to impart thereto a limited pendulous oscillation reducing friction incident to said relative rotation.

10. A self-contained journaling mechanism for connecting relatively rotating aligned shafts, comprising at least one circular series of rolling bearings encircling each shaft, and a tubular ring spanning both shafts and engaging the corresponding rolling bearings and having an eccentric center of gravity rendering said ring pendulous, whereby the relative rotation between said shafts is transmitted through said bearings to said ring to impart thereto a pendulous oscillation reducing the friction incident to said relative rotation.

11. A self-contained journaling mechanism for connecting aligned relatively rotating first members, comprising a second member spanning the ends of said first members, said first and second members being telescoped, rolling bearings interposed between said first and second members, and an eccentric weight on said second member rendering the same pendulous, whereby the relative rotation between said first members is transmitted through said bearings to said second members to impart thereto a pendulous oscillation reducing the friction incident to said relative rotation.

12. A self-contained journaling mechanism for connecting aligned relatively rotating first members, comprising a second member spanning the ends of said first members, said first and second members being telescoped, at least one circular series of ball bearings interposed between said first and second members, and an eccentric weight on said second member rendering the same pendulous, whereby the relative rotation between said first members is transmitted through said bearings to said second member to impart thereto a pendulous oscillation reducing the friction incident to said relative rotation.

13. A self-contained journaling mechanism for connecting two axially-aligned relatively rotating first members, comprising a second member coaxial with said first members and forming an annulus with each of said first members, rolling bearings interposed in the annulus between said second member and each of said first members for connecting said second member with each of said first members, and a weight on said second member arranged eccentrically of the axis thereof for rendering said second member pendulous, whereby relative rotation between said first members is transmitted through said bearings to said second member to impart thereto a pendulous oscillation reducing the friction incident to said relative rotation.

ARTHUR P. DAVIS.